(12) United States Patent
Sato

(10) Patent No.: US 7,625,306 B2
(45) Date of Patent: Dec. 1, 2009

(54) CVT HAVING LOW HOLDING POSITION AND OVERDRIVE HOLDING POSITION

(75) Inventor: Takao Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 11/703,726

(22) Filed: Feb. 8, 2007

(65) Prior Publication Data
US 2007/0238569 A1 Oct. 11, 2007

(30) Foreign Application Priority Data
Apr. 11, 2006 (JP) ............................. 2006-109052

(51) Int. Cl.
*F16H 37/00* (2006.01)
*F16H 55/56* (2006.01)
(52) U.S. Cl. ................................. 474/80; 474/8; 74/745
(58) Field of Classification Search .................. 474/80, 474/15–28; 475/116, 210–213; *F16H 37/02, F16H 9/12*
See application file for complete search history.

(56) References Cited

U.S. PATENT DOCUMENTS

| | | | |
|---|---|---|---|
| 4,907,471 A | * | 3/1990 | Ishimaru ...................... 74/745 |
| 4,973,288 A | * | 11/1990 | Sakakibara et al. ............. 474/8 |
| 5,024,638 A | * | 6/1991 | Sakakibara et al. ......... 475/210 |
| 2004/0077444 A1 | * | 4/2004 | Kanda et al. .................... 474/8 |
| 2004/0185973 A1 | * | 9/2004 | Sato et al. ....................... 474/8 |

FOREIGN PATENT DOCUMENTS

JP 1-150065 A 6/1989

* cited by examiner

*Primary Examiner*—Robert A Siconolfi
*Assistant Examiner*—San Aung
(74) *Attorney, Agent, or Firm*—Westerman, Hattori, Daniels & Adrian, LLP

(57) ABSTRACT

A transmission including a primary shaft rotatably supported, a drive pulley mounted on the primary shaft, a secondary shaft rotatably supported, a driven pulley mounted on the secondary shaft, a belt wrapped between the drive pulley and the driven pulley, a first output shaft rotatably supported, a second output shaft rotatably supported, a low/reverse drive gear provided on the primary shaft, a low driven gear provided on the second output shaft and meshing with the low/reverse drive gear, and a reverse driven gear provided on the first output shaft and meshing with the low driven gear.

5 Claims, 2 Drawing Sheets

CVT HAVING LOW HOLDING POSITION AND OVERDRIVE HOLDING POSITION

BACKGROUND OF THE INVENTION

1. Field of the Invention

The present invention relates to a transmission for a vehicle having a stepless shift mechanism, a low holding position, and an overdrive holding position.

2. Description of the Related Art

Conventionally known is that the addition of a low holding position to a continuously variable transmission (CVT) can improve a driving efficiency at a low-speed position or can reduce a load input to the CVT. Further, it is also known that the addition of an overdrive holding position to the CVT can improve a driving efficiency during cruising, for example, thereby improving a fuel economy.

However, such a transmission having a stepless shift mechanism, a low holding position, and an overdrive holding position causes a problem in the prior art disclosed in Japanese Patent Laid-open No. Hei 1-150065, for example, such that the transmission becomes large in size because of a multiplicity of shafts and an increase in axial length, causing a reduction in mountability of the transmission to a vehicle and an increase in weight of the transmission.

SUMMARY OF THE INVENTION

It is therefore an object of the present invention to provide a transmission having a stepless shift mechanism, a low holding position, and an overdrive holding position which can be reduced in size and weight.

In accordance with an aspect of the present invention, there is provided a transmission having a stepless shift mechanism and a stepped shift mechanism arranged in parallel between an input and an output, including a primary shaft rotatably supported; a drive pulley mounted on the primary shaft; a secondary shaft rotatably supported; a driven pulley mounted on the secondary shaft; a belt wrapped between the drive pulley and the driven pulley; a first output shaft rotatably supported; a second output shaft rotatably supported; a low/reverse drive gear provided on the primary shaft; a low driven gear provided on the second output shaft and meshing with the low/reverse drive gear; and a reverse driven gear provided on the first output shaft and meshing with the low driven gear; wherein in forward running at a low-speed position, the power input to the primary shaft is output through the low/reverse drive gear, the low driven gear, and the second output shaft; and in reverse running, the power input to the primary shaft is output through the low/reverse drive gear, the low driven gear, the reverse driver gear, and the first output shaft.

With this arrangement, a part of the gears required for establishment of the low holding position and a part of the gears required for establishment of the reverse holding position can be integrated as a common gear, thereby reducing the number of parts of the transmission. More specifically, a low drive gear and a reverse drive gear both originally necessary in the transmission can be integrated as the low/reverse drive gear. Similarly, the low driven gear can be used also as a reverse idler gear, thereby expecting a reduction in size and weight of the transmission.

Preferably, the transmission further includes an overdrive drive gear provided on the primary shaft; an overdrive driven gear provided on the second output shaft and meshing with the overdrive drive gear; a secondary drive gear provided on the secondary shaft; and a secondary driven gear provided on the first output shaft and meshing with the secondary drive gear.

With this arrangement, the reverse driven gear and the secondary driven gear are provided on the first output shaft, and the low driven gear and the overdrive driven gear are provided on the second output shaft. Thus, two gears are provided on each of the first and second output shafts. Accordingly, the concentrated arrangement of components on one output shaft can be prevented to thereby reduce the axial size of the transmission.

Preferably, the secondary drive gear is rotatably provided on the secondary shaft; the secondary driven gear is connected to the first output shaft; and the transmission further includes a first clutch provided on the secondary shaft for connecting and disconnecting the transmission of power between the secondary drive gear and the secondary shaft.

Only the secondary drive gear is provided as a component on the secondary shaft, and an empty space is necessarily produced on the secondary shaft in view of the number of components as compared with the primary shaft. With the above arrangement of the present invention, the first clutch is provided in this empty space, so that the components can be arranged in a well balanced manner on the primary shaft and the secondary shaft, thereby reducing the length of the transmission. Further, the first clutch is arranged between the stepless shift mechanism and the drive wheels. Accordingly, the stepless shift mechanism can be protected by the first clutch.

Preferably, the low/reverse drive gear and the overdrive drive gear are integrated and rotatably provided on the primary shaft; the low driven gear and the overdrive driven gear are individually rotatably provided on the second output shaft; the reverse driven gear is rotatably provided on the first output shaft; and the transmission further includes a second clutch provided on the primary shaft for connecting and disconnecting the transmission of power between the integrated low/reverse drive gear and overdrive drive gear and the primary shaft; a first claw-type power connection/disconnection mechanism provided on the second output shaft for allowing the transmission of power selectively from the low driven gear and the overdrive driven gear to the second output shaft; and a second claw-type power connection/disconnection mechanism provided on the first output shaft for connecting and disconnecting the transmission of power between the reverse driven gear and the first output shaft.

With this arrangement, the power transmission paths having three kinds of forward speed positions and one reverse position can be switched by the two clutches (friction clutches) and the two claw-type power connection/disconnection mechanisms. A claw-type power connection/disconnection mechanism is smaller in size than a friction clutch, so that the transmission using a claw-type power connection/disconnection mechanism can be reduced in size. Moreover, in general, a claw-type power connection/disconnection mechanism is lower in cost than a friction clutch, so that the transmission can be provided at a low cost by reducing the number of costly friction clutches.

Further, the change from the low holding position to the stepless shift condition or the change from the stepless shift condition to the overdrive holding position can be made by a clutch-to-clutch change. Accordingly, the marketability of a shift performance bearing comparison with that of a conventional automatic transmission can be ensured in spite of the simplification of components. In addition, the totally four power connection/disconnection mechanisms are individually provided on the totally four shafts, so that the concentrated arrangement of components on a specific shaft can be prevented to thereby prevent an increase in axial length of the transmission.

More preferably, the transmission further includes an overdrive drive gear provided on the primary shaft; a secondary drive gear provided on the secondary shaft; and a first clutch provided on the secondary shaft for connecting and disconnecting the transmission of power between the secondary drive gear and the secondary shaft; the stepless shift mechanism having the drive pulley having a fixed pulley member and a movable pulley member, the driven pulley having a fixed pulley member and a movable pulley member, and the belt; the low/reverse drive gear and the overdrive drive gear being provided on the primary shaft at a position axially behind the fixed pulley member of the drive pulley; the secondary drive gear and the first clutch being provided on the secondary shaft at a position axially behind the movable pulley member of the driven pulley; the fixed pulley member of the drive pulley and the movable pulley member of the driven pulley being arranged on the same axial side with respect to the belt.

In the case that the movable pulley member of the drive pulley and the movable pulley member of the driven pulley are diagonally arranged, an empty space is produced axially behind the fixed pulley member of the drive pulley. Accordingly, the low/reverse drive gear and the overdrive drive gear are arranged in this empty space. Further, an empty space smaller than the above empty space is produced axially behind the movable pulley member of the driven pulley, and the secondary drive gear and the first clutch are arranged in this empty space. Thus, the components can be arranged in a well balanced manner.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
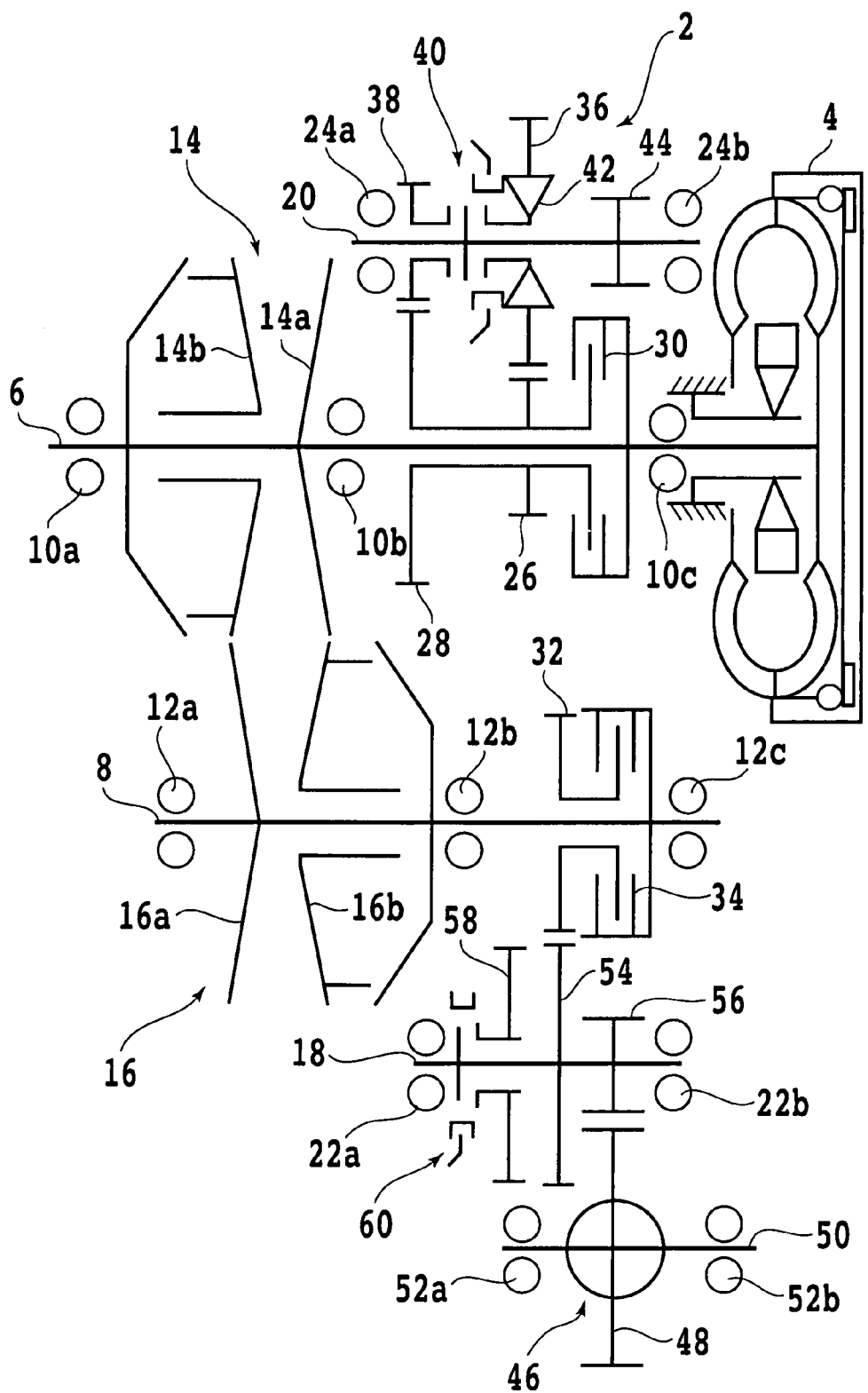
FIG. 1 is a skeleton diagram of a transmission according to a preferred embodiment of the present invention.
Figure 2:
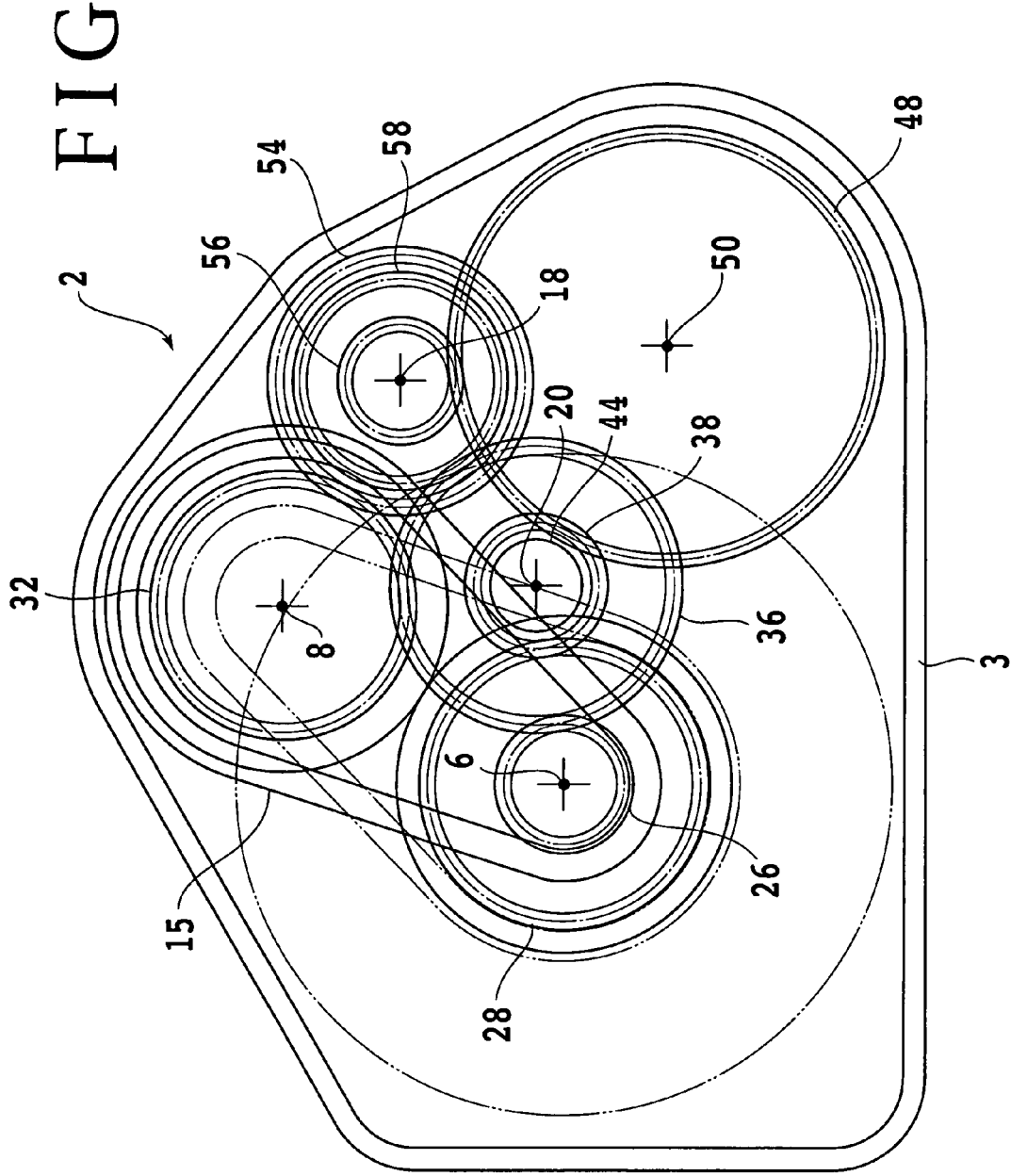
FIG. 2 is a schematic side view of the transmission shown in FIG. 1.

A preferred embodiment of the present invention will now be described in detail with reference to the drawings. FIG. 1 is a skeleton diagram of a transmission according to a preferred embodiment of the present invention. FIG. 2 is a schematic side view of the transmission shown in FIG. 1. Referring to FIG. 1, a pump impeller of a torque converter 4 is connected to a crankshaft of an engine (not shown), so that the pump impeller is driven by the engine. A turbine runner of the torque converter 4 is connected to a primary shaft (drive pulley shaft) 6 of the transmission 2.

The primary shaft 6 is rotatably supported by bearings 10a, 10b, and 10c. Reference numeral 8 denotes a secondary shaft (driven pulley shaft), which is arranged in parallel to the primary shaft 6. The secondary shaft 8 is rotatably supported by bearings 12a, 12b, and 12c. A drive pulley 14 is mounted on the primary shaft 6. The drive pulley 14 is composed of a fixed pulley member 14a and a movable pulley member 14b. On the other hand, a driven pulley 16 is mounted on the secondary shaft 8. The driven pulley 16 is composed of a fixed pulley member 16a and a movable pulley member 16b. A metal belt 15 (see FIG. 2) is wrapped between the drive pulley 14 and the driven pulley 16.

Reference numeral 18 denotes a first output shaft, which is arranged in parallel to the primary shaft 6 and the secondary shaft 8. The first output shaft 18 is rotatably supported by a pair of bearings 22a and 22b. Reference numeral 20 denotes a second output shaft, which is arranged in parallel to the primary shaft 6 and the secondary shaft 8. The second output shaft 20 is rotatably supported by a pair of bearings 24a and 24b.

A low/reverse drive gear 26 and an overdrive drive gear 28 are rotatably provided on the primary shaft 6. According to this preferred embodiment, the low/reverse drive gear 26 and the overdrive drive gear 28 are integrated with each other. A low/reverse/overdrive clutch (second clutch) 30 for connecting and disconnecting the transmission of power between the integrated low/reverse drive gear 26 and overdrive drive gear 28 and the primary shaft 6 is provided on the primary shaft 6.

A secondary drive gear 32 is rotatably provided on the secondary shaft 8. A CVT clutch (first clutch) 34 for connecting and disconnecting the transmission of power between the secondary drive gear 32 and the secondary shaft 8 is provided on the secondary shaft 8. A low driven gear 36 meshing with the low/reverse drive gear 26 and an overdrive driven gear 38 meshing with the overdrive drive gear 28 are rotatably provided on the second output shaft 20.

A low/overdrive servo mechanism (first claw-type power connection/disconnection mechanism) 40 for allowing the transmission of power selectively from the low driven gear 36 and the overdrive driven gear 38 to the second output shaft 20 is provided on the second output shaft 20. A one-way clutch 42 is provided between the low driven gear 36 and the low/overdrive servo mechanism 40. A final drive gear 44 is connected to the second output shaft 20. The final drive gear 44 is in mesh with a ring gear (final driven gear) 48 of a differential unit 46. A drive shaft 50 connected to the output of the differential unit 46 is rotatably supported by bearings 52a and 52b.

A secondary driven gear 54 meshing with the secondary drive gear 32 is connected to the first output shaft 18, and a reverse driven gear 58 meshing with the low driven gear 36 is rotatably provided on the first output shaft 18. A reverse servo mechanism (second claw-type power connection/disconnection mechanism) 60 for connecting and disconnecting the transmission of power between the reverse driven gear 58 and the first output shaft 18 is provided on the first output shaft 18. A final drive gear 56 meshing with the ring gear 48 of the differential unit 46 is connected to the first output shaft 18.

The operation of the preferred embodiment mentioned above will now be described. At starting the vehicle, the low/reverse/overdrive clutch 30 is engaged to connect the low/reverse drive gear 26 to the primary shaft 6. At the same time, the low/overdrive servo mechanism 40 is slid rightward to connect the low driven gear 36 through the one-way clutch 42 to the second output shaft 20. As a result, the power from the engine is transmitted through the primary shaft 6, the low/reverse drive gear 26, the low driven gear 36, the second output shaft 20, and the final drive gear 44 to the differential unit 46, thereby driving the drive shaft 50.

When the vehicle speed is increased to a certain speed, the CVT clutch 34 is engaged to connect the secondary drive gear 32 to the secondary shaft 8. As a result, the power from the engine is transmitted through the primary shaft 6, the drive pulley 14, the metal belt 15, the driven pulley 16, the secondary shaft 8, the secondary drive gear 32, the secondary driven gear 54, the first output shaft 18, and the final drive gear 56 to the differential unit 46, thereby driving the drive shaft 50 with a continuously variable speed ratio.

At this time, the drive gear 44 on the second output shaft 20 is in mesh with the ring gear 48 of the differential unit 46, so that the second output shaft 20 is driven according to the continuously variable speed ratio. However, since the low driven gear 36 is connected through the one-way clutch 42 to the second output shaft 20, the one-way clutch 42 slips and the torque of the second output shaft 20 is therefore not transmitted to the low/reverse drive gear 26. Simultaneously with or after engagement of the CVT clutch 34, the low/reverse/overdrive clutch 30 is disengaged to disconnect the low/reverse drive gear 26 from the primary shaft 6, thereby continuing to drive the vehicle with the continuously variable speed ratio.

When the vehicle speed is further increased, the low/overdrive servo mechanism 40 is slid leftward to connect the overdrive driven gear 38 to the second output shaft 20. Then, the CVT clutch 34 is disengaged and the low/reverse/overdrive clutch 30 is engaged to connect the overdrive drive gear 28 to the primary shaft 6. As a result, the power from the engine is transmitted through the primary shaft 6, the overdrive drive gear 28, the overdrive driven gear 38, the second output shaft 20, and the final drive gear 44 to the differential unit 46, thereby driving the drive shaft 50 at high speeds.

In reverse running of the vehicle, the CVT clutch 34 is disengaged and the low/reverse/overdrive clutch 30 is engaged. Further, the low/overdrive servo mechanism 40 is kept in its neutral position, and the reverse servo mechanism 60 is driven to connect the reverse driven gear 58 to the first output shaft 18. As a result, the power from the engine is transmitted through the primary shaft 6, the low/reverse drive gear 26, the low driven gear 36, the reverse driven gear 58, the first output shaft 18, and the final drive gear 56 to the differential unit 46, thereby driving the drive shaft 50 in a direction opposite to the direction for the forward running.

Table 1 shows the operational conditions of the low/reverse/overdrive clutch 30, the CVT clutch 34, the low/overdrive servo mechanism 40, and the reverse servo mechanism 60 in the neutral position, in the low running condition, in the CVT running condition, in the overdrive running condition, and in the reverse running condition.

TABLE 1

|  | LOW/RVS/OD clutch | CVT clutch | LOW/OD servo | RVS servo |
|---|---|---|---|---|
| OD | ○ | X | OD | N |
| CVT | X | ○ | LOW/N/OD | N |
| LOW | ○ | X | LOW | N |
| N | X | X | LOW | N |
| RVS | ○ | X | N | RVS |

In Table 1, the open circles ○ mean that the clutches 30 and 34 are in the engaged condition, and the crosses X mean that the clutches 30 and 34 are in the disengages condition. Further, LOW/N/OD for CVT running means that the low/overdrive servo mechanism 40 may select any one of the low, neutral, and overdrive positions.

According to the preferred embodiment mentioned above, a part of the gears required for establishment of the low holding position and a part of the gears required for establishment of the reverse holding position can be integrated as a common gear, thereby reducing the number of parts of the transmission. More specifically, a low drive gear and a reverse drive gear both originally necessary in the transmission can be integrated as the low/reverse drive gear 26. Similarly, the low driven gear 36 can be used also as a reverse idler gear, thereby expecting a reduction in size and weight of the transmission.

The secondary driven gear 54 and the reverse driven gear 58 are provided on the first output shaft 18, and the low driven gear 36 and the overdrive driven gear 38 are provided on the second output shaft 20. Thus, two gears are provided on each of the first and second output shafts 18 and 20. Accordingly, the concentrated arrangement of components on one shaft can be prevented to thereby reduce the axial size of the transmission. Only the secondary drive gear 32 is provided as a gear on the secondary shaft 8, and an empty space is necessarily produced on the secondary shaft 8 in view of the number of gears as compared with the primary shaft 6. According to this preferred embodiment, the CVT clutch 34 is provided in this empty space, so that the components can be arranged in a well balanced manner on the primary and secondary shafts 6 and 8, thereby reducing the length of the transmission.

Further, the CVT clutch 34 is arranged between the CVT and the drive wheels. Accordingly, the CVT can be protected by the CVT clutch 34. For example, in the case that a tire slipping on a slippery road surface suddenly restores a grip force, the CVT clutch 34 can cut off an impactive force input from the drive shaft 50 into the CVT. Further, according to this preferred embodiment, the power transmission paths having three kinds of forward speed positions and one reverse position can be switched by the two friction clutches 30 and 34 and the two claw-type power connection/disconnection mechanisms (servo mechanisms) 40 and 60.

A claw-type power connection/disconnection mechanism is smaller in size than a friction clutch, so that the transmission using a claw-type power connection/disconnection mechanism can be reduced in size. Moreover, in general, a claw-type power connection/disconnection mechanism is lower in cost than a friction clutch, so that the transmission can be provided at a low cost by reducing the number of costly friction clutches. Further, the change from the low holding position to the CVT condition or the change from the CVT condition to the overdrive holding position can be made by a clutch-to-clutch change. Accordingly, the marketability of a shift performance bearing comparison with that of a conventional automatic transmission can be ensured in spite of the simplification of components. In addition, the totally four power connection/disconnection mechanisms are individually provided on the totally four shafts, so that the concentrated arrangement of components on a specific shaft can be prevented to thereby prevent an increase in axial length of the transmission.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A transmission having a stepless shift mechanism and a stepped shift mechanism arranged in parallel between an input and an output, comprising:
a primary shaft rotatably supported;
a drive pulley mounted on said primary shaft;
a secondary shaft rotatably supported;
a driven pulley mounted on said secondary shaft;
a belt wrapped between said drive pulley and said driven pulley;
a first output shaft rotatably supported;
a second output shaft rotatably supported;
a low/reverse drive gear provided on said primary shaft;

a low driven gear provided on said second output shaft and meshing with said low/reverse drive gear; and a reverse driven gear provided on said first output shaft and meshing with said low driven gear;

wherein in forward running at a low-speed position, the power input to said primary shaft is output through said low/reverse drive gear, said low driven gear, and said second output shaft; and in reverse running, the power input to said primary shaft is output through said low/reverse drive gear, said low driven gear, said reverse driven gear, and said first output shaft;

an overdrive drive gear provided on said primary shaft;

an overdrive driven gear provided on said second output shaft and meshing with said overdrive drive gear;

a secondary drive gear provided on said secondary shaft; and a secondary driven gear provided on said first output shaft and meshing with said secondary drive gear.

2. The transmission according to claim 1, wherein:

said secondary drive gear is rotatably provided on said secondary shaft;

said secondary driven gear is connected to said first output shaft; and said transmission further comprises a first clutch provided on said secondary shaft for connecting and disconnecting the transmission of power between said secondary drive gear and said secondary shaft.

3. The transmission according to claim 2, wherein:

said low/reverse drive gear and said overdrive drive gear are integrated and rotatably provided on said primary shaft;

said low driven gear and said overdrive driven gear are individually rotatably provided on said second output shaft;

said reverse driven gear is rotatably provided on said first output shaft; and said transmission further comprises:

a second clutch provided on said primary shaft for connecting and disconnecting the transmission of power between said integrated low/reverse drive gear and overdrive drive gear and said primary shaft;

a first claw-type power connection/disconnection mechanism provided on said second output shaft for allowing the transmission of power selectively from said low driven gear and said overdrive driven gear to said second output shaft; and a second claw-type power connection/disconnection mechanism provided on said first output shaft for connecting and disconnecting the transmission of power between said reverse driven gear and said first output shaft.

4. A transmission having a stepless shift mechanism and a stepped shift mechanism arranged in parallel between an input and an output, comprising:

a primary shaft rotatably supported;

a drive pulley mounted on said primary shaft;

a secondary shaft rotatably supported;

a driven pulley mounted on said secondary shaft;

a belt wrapped between said drive pulley and said driven pulley;

a first output shaft rotatably supported;

a second output shaft rotatably supported;

a low/reverse drive gear provided on said primary shaft;

a low driven gear provided on said second output shaft and meshing with said low/reverse drive gear; and a reverse driven gear provided on said first output shaft and meshing with said low driven gear;

wherein in forward running at a low-speed position, the power input to said primary shaft is output through said low/reverse drive gear, said low driven gear, and said second output shaft; and in reverse running, the power input to said primary shaft is output through said low/reverse drive gear, said low driven gear, said reverse driven gear, and said first output shaft;

an overdrive drive gear provided on said primary shaft;

a secondary drive gear provided on said secondary shaft; and a first clutch provided on said secondary shaft for connecting and disconnecting the transmission of power between said secondary drive gear and said secondary shaft;

said stepless shift mechanism including said drive pulley having a fixed pulley member and a movable pulley member, said driven pulley having a fixed pulley member and a movable pulley member, and said belt;

said low/reverse drive gear and said overdrive drive gear being provided on said primary shaft at a position axially behind said fixed pulley member of said drive pulley;

said secondary drive gear and said first clutch being provided on said secondary shaft at a position axially behind said movable pulley member of said driven pulley;

said fixed pulley member of said drive pulley and said movable pulley member of said driven pulley being arranged on the same axial side with respect to said belt.

5. The transmission according to claim 3, wherein said first claw-type power connection/disconnection mechanism selectively connects said low driven gear and said overdrive driven gear to said second output shaft according to a vehicle speed.

* * * * *